United States Patent
Dorok et al.

(10) Patent No.: US 11,091,321 B2
(45) Date of Patent: Aug. 17, 2021

(54) MOTOR-DRIVEN CONVEYING ROLLER COMPRISING A COOLING SLEEVE PRESSED INTO THE DRUM TUBE

(71) Applicant: INTERROLL HOLDING AG, Sant' Antonino (CH)

(72) Inventors: Ralf Dorok, Sant' Antonino (CH); Reinhold Weichbrodt, Sant' Antonino (CH)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/646,223

(22) PCT Filed: Sep. 5, 2018

(86) PCT No.: PCT/EP2018/073849
§ 371 (c)(1),
(2) Date: Mar. 11, 2020

(87) PCT Pub. No.: WO2019/052871
PCT Pub. Date: Mar. 21, 2019

(65) Prior Publication Data
US 2020/0270065 A1 Aug. 27, 2020

(30) Foreign Application Priority Data
Sep. 15, 2017 (DE) .................... 10 2017 121 486.0

(51) Int. Cl.
*B65G 23/08* (2006.01)
*B65G 13/06* (2006.01)
(Continued)

(52) U.S. Cl.
CPC ............. *B65G 23/08* (2013.01); *B65G 13/06* (2013.01); *B65G 39/02* (2013.01); *B65G 39/07* (2013.01)

(58) Field of Classification Search
CPC ........ B65G 13/06; B65G 23/08; B65G 39/02; B65G 39/07; H02K 7/1012; H02K 9/02; H02K 9/22
See application file for complete search history.

(56) References Cited

U.S. PATENT DOCUMENTS

| | | | |
|---|---|---|---|
| 6,672,449 B2 * | 1/2004 | Nakamura | B65G 23/08 198/788 |
| 7,987,970 B2 * | 8/2011 | Schwesig | H02K 9/22 198/788 |

(Continued)

FOREIGN PATENT DOCUMENTS

| | | |
|---|---|---|
| CN | 1538595 | 10/2004 |
| CN | 1823461 | 8/2006 |

(Continued)

*Primary Examiner* — Gene O Crawford
*Assistant Examiner* — Keith R Campbell
(74) *Attorney, Agent, or Firm* — Price Heneveld LLP

(57) ABSTRACT

A motor-driven conveyor roller for conveyor systems for conveying containers, pallets, and the like, includes a drum tube with a cavity formed therein and a longitudinal axis, a shaft which extends in the longitudinal axis and on which the drum tube is supported by at least one bearing, and an electric drive unit arranged in the cavity. The motor-driven conveyor includes a cooling sleeve which is fixed radially inwardly to the drum tube and at least partially radially surrounds the drive unit so that a radial air gap is formed between the drive unit and the cooling sleeve. The disclosure also relates to a manufacturing process for such a conveyor roller.

24 Claims, 4 Drawing Sheets

(51) Int. Cl.
   *B65G 39/02*   (2006.01)
   *B65G 39/07*   (2006.01)

(56) References Cited

U.S. PATENT DOCUMENTS

| | | | | |
|---|---|---|---|---|
| 8,608,457 | B2* | 12/2013 | Coenraets | E06B 9/72 417/368 |
| 2002/0056609 | A1* | 5/2002 | Nakamura | B65G 23/08 198/780 |
| 2007/0114861 | A1* | 5/2007 | Bott | H02K 3/522 310/71 |
| 2016/0201690 | A1* | 7/2016 | Chou | F04D 29/5806 417/366 |
| 2020/0102151 | A1* | 4/2020 | Lindemann | F16B 5/08 |

FOREIGN PATENT DOCUMENTS

| | | |
|---|---|---|
| CN | 106329828 | 1/2017 |
| DE | 2238562 | 2/1974 |
| DE | 29700666 | 3/1997 |
| DE | 10324664 | 12/2004 |
| DE | 60109874 | 3/2006 |
| DE | 102006004421 | 8/2006 |
| DE | 102006060009 | 6/2008 |
| DE | 102008061979 | 6/2010 |
| DE | 202016100011 | 2/2016 |
| DE | 102015201103 | 7/2016 |
| DE | 102016124689 | 6/2018 |
| EP | 1209101 | 5/2002 |
| EP | 2492047 | 8/2012 |
| JP | S528882 | 1/1977 |
| JP | S542985 | 1/1979 |
| JP | S60122615 | 7/1985 |
| JP | H10304618 | 11/1998 |
| KR | 20060068867 | 6/2006 |

* cited by examiner

MOTOR-DRIVEN CONVEYING ROLLER COMPRISING A COOLING SLEEVE PRESSED INTO THE DRUM TUBE

CROSS-REFERENCE TO FOREIGN PRIORITY APPLICATION

The present application claims the benefit under 35 U.S.C. §§ 119(b), 119(e), 120, and/or 365(c) of PCT/EP2018/073849 filed Sep. 5, 2018, which claims priority to German Application No. 10 2017 121 486.0 filed Sep. 15, 2017.

FIELD OF THE INVENTION

The invention relates to a motor-driven conveyor roller for conveyor systems for conveying containers, pallets, and the like, comprising a drum tube with a cavity formed therein and a longitudinal axis, a shaft which extends in the longitudinal axis and on which the drum tube is mounted by means of at least one rotary bearing, and an electric drive unit arranged in the cavity. The invention further relates to a manufacturing process for the production of a motor-driven conveyor roller of the aforementioned type.

BACKGROUND OF THE INVENTION

Motor-driven conveyor rollers of this type are used for various purposes in logistics applications. For example, they can be used in pallet handling, parcel handling in parcel shipping centers, container handling in warehouses of various types, baggage handling in airports and many other applications. Such motor-driven conveyor rollers are commonly used in conveyor lines consisting of several rollers arranged next to each other, the upper circumferential surface of each of which serves to receive the goods to be conveyed. On the one hand, idle rollers are arranged in these conveyor sections, which are without drive and are only rotatably mounted in a conveyor frame. Furthermore, these conveyor lines are equipped with motor-driven conveyor rollers which are set in rotation by an electric drive unit. These motorized conveyor rollers are designed in such a way that the drive unit is located inside the roller itself, so that no mechanical components located outside the roller body or drum tube are required to generate the rotation of the roller. On the one hand, the motor-driven conveyor rollers serve to transport the material to be conveyed directly over the outer circumferential surface of their roller body. On the other hand, by transferring the rotation of the motor-driven conveyor roller to one or more idling rollers by means of a transfer element, for example, a belt drive, the motor-driven conveyor roller can also set the idling rollers in rotation in order to drive the material to be conveyed also over their outer circumferential surface.

A problem related to such motor-driven conveyor rollers, especially in drive units with high power, is to provide sufficient cooling for the drive unit. Oil cooling is often not possible due to the structural conditions and is also not desired in the food processing industry. In order to be able to equip a dry-running, motor-driven conveyor roller with a high output, cooling is therefore necessary.

From DE 22 38 562 A, for example, an internal rotor electric motor is known, which has a heat conduction tube radially inside the rotor laminations, which connects heat conduction surfaces between the rotor lamination packets and thus cools the rotor. However, when used with conveyor rollers, there is still the problem of transferring the heat from the inside of the drum tube to the outside.

DE 103 24 664 A1 proposes a roller motor that has a heat sink axially adjacent to the electric motor, which is connected via a tube to the stator of the outer rotor electric motor in order to conduct heat from the interior of the electric motor to the axially adjacent heat sink, which then transfers the heat to the drum tube. One disadvantage of this is the complex assembly and the restriction to external rotor motors as well as the uneven heat transfer and the uneven heating of the drum tube on the outside.

A similar solution is known from DE 10 2006 060 009 A1. In the solution proposed there, thermal conduction elements are provided at both ends of the stator. However, the above mentioned disadvantages apply here as well.

From DE 10 2008 061 979 A1 of the applicant, a drum motor with an internal rotor electric motor and heat conducting body is known. The heat conducting body is arranged axially adjacent to the electric motor. A positive feature of the heat conducting body is that it has several radially expanding steps so that the heat transfer to the drum tube is more uniform and a more even heating of the drum tube can be ensured. However, there is still a need to dissipate more heat and achieve more uniform and efficient cooling.

In particular, the option for use in motor-driven conveyor rollers, which are generally smaller in diameter and where the installation space is more restricted than is generally the case with drum motors, should also be guaranteed.

SUMMARY OF THE INVENTION

The object of the present invention is, therefore, to provide a motor-driven conveyor roller of the type mentioned above, which has improved cooling, is easy to install and can achieve uniform heat dissipation on the drum tube.

In a motor-driven conveyor roller of the type mentioned above, this object is solved by a cooling sleeve which is attached radially inwardly to the drum tube and at least partially surrounds the drive unit radially so that a radial air gap is formed between the drive unit and the cooling sleeve.

On the one hand, the cooling sleeve radially surrounds the drive unit, so that a larger transmission area is provided between the cooling sleeve and the drive unit than if the cooling sleeve were arranged axially adjacent to the drive unit. On the other hand, the cooling sleeve is not connected to the drive unit, but to the drum tube. In principle, it is conceivable that such a cooling sleeve could also be attached radially to the outside of the drive unit, for example, by clamping it to the drive unit. However, there is a risk that the drive unit will be damaged and problems may also arise if the drive unit requires maintenance.

According to the invention, the cooling sleeve is, therefore, connected to the drum tube and an air gap is formed between the drive unit and cooling sleeve. Heat transfer between the drive unit and the cooling sleeve is mainly by thermal radiation and only partially by thermal convection via the air in the air gap. As the cooling sleeve radially surrounds the drive unit, a noticeably more even heat dissipation is also achieved on the outside of the drum tube, as not only the section of the drum tube on which the drive unit is not located can be used for heat dissipation, but also and especially the area of the drive unit itself.

Furthermore, this greatly simplifies installation. Changes to the drive unit are not necessary. Only a gap between drive unit and drum tube is used to accommodate a cooling sleeve. The cooling sleeve can also be used to compensate for tolerances or to adapt the diameter of the drive unit to changing drum tube diameters. It is conceivable, for example, that a drum tube can have an outer diameter of 50 mm, 60 mm or 80 mm. However, all three drum tubes can be driven by the same drive unit. If the drive unit is used with a 60 mm or 80 mm drum tube, a radial distance between the drive unit and the inner surface of the drum tube would be very large, so that cooling by means of heat radiation is severely restricted. According to the invention, the cooling sleeve can be used advantageously here. The cooling sleeve can be used to keep an air gap between the cooling sleeve and the drive unit constant regardless of the diameter of the drum tube, so that cooling the drive unit by means of heat radiation to the cooling sleeve is largely independent of the diameter of the drum tube itself. It should be understood that in addition to drum tubes with 50, 60, and 80 mm, there may also be drum tubes with other diameters, for example 55 mm. This depends primarily on the desired requirements.

In a first preferred design, the cooling sleeve is force-fitted to the drum tube. The cooling sleeve is preferably pressed into the drum tube. This further simplifies assembly and makes it possible to avoid additional assembly elements, such as screws or similar. It is also not necessary to make a weld seam to secure the cooling sleeve. Furthermore, a cooling sleeve frictionally connected to the drum tube ensures flat contact between the cooling sleeve and the inner surface of the drum tube, which makes heat transfer by means of heat conduction from the cooling sleeve to the drum tube particularly effective.

It is also preferred that the cooling sleeve is axially slotted. The cooling sleeve preferably has an axial slot, which preferably runs parallel to the central axis. However, the slot can also run like a helix around the central axis. This further simplifies installation. For assembly, it is possible to slightly compress the sleeve to bring it into the inside of the drum tube. Furthermore, the cooling sleeve is able to compensate for certain radial tolerances of the drum tube by means of an axial slot. Drum tubes are usually longitudinally welded tubes and have a weld seam on the inside that runs in an axial direction. As a result, an internal diameter may vary slightly, so it is advisable to design the cooling sleeve in such a way that such tolerances can be compensated, while still providing a firm connection between the cooling sleeve and the barrel tube. The cooling sleeve is preferably designed in such a way that it exerts a permanent clamping force on the drum tube so that unintentional loosening of the cooling sleeve is not possible. The slot does not have to be particularly wide in the circumferential direction. It should be wide enough to allow easy compression of the cooling sleeve, but not too wide to make the best possible use of heat conduction. The axial slot is preferably continuous, i.e., the cooling sleeve is completely slotted. Nevertheless, the cooling sleeve is designed as a single piece so that further elements and additional assembly steps can be largely avoided.

To further simplify assembly, it is also conceivable that the cooling sleeve has an assembly chamfer at one axial front end, preferably with an axial annular extension which has a smaller diameter than the outer surface of the cooling sleeve. This further simplifies the positioning of the cooling sleeve to the drum tube and the insertion or pressing of the cooling sleeve into the drum tube.

Preferably the drive unit has an electric motor and the cooling sleeve extends in axial direction essentially completely over the electric motor. The electric motor of the drive unit is the component that generates most heat and whose heat must be dissipated. Sufficient cooling of the electric motor allows higher performance to be achieved, as a switch-off temperature of the electric motor is reached less frequently or less quickly due to the improved cooling. The section of the drive unit in which the electric motor is located therefore requires cooling.

The electric motor is preferably designed as an internal rotor electric motor, whereby the stator is connected to and supported by the shaft of the motor-driven conveyor roller. In principle, such a design of motor-driven conveyor rollers is known.

Furthermore, it is preferred that the drive unit comprises a gear unit and that the cooling sleeve extends essentially completely over the gear unit in the axial direction. Depending on the type of gear unit used, the coverage of the gear unit by the cooling sleeve can vary. Thus, for example, in a two-stage gear unit it is preferably provided that the cooling sleeve extends completely over it, whereas in a three-stage gear unit with a correspondingly longer housing it is preferably provided that the cooling sleeve extends substantially completely over it, for example, over the first two gear stages. This makes it possible to provide only one type of cooling sleeve for both types of gear units so that identical parts can be used. In principle, an identical part can also be used as a cooling sleeve within a conveyor roller series which is so long that it extends axially completely over the gear unit in the longest gear unit design and protrudes axially slightly in the shorter gear unit design. The gear unit is usually located axially adjacent to the electric motor. The gear unit, therefore, also absorbs heat from the electric motor and develops heat itself due to friction. It is, therefore, preferable that the cooling sleeve not only extends axially essentially completely over the electric motor, but also extends axially essentially completely over the gear unit. In addition, the cooling sleeve can extend axially further adjacent to the electric motor and gear unit to ensure even more uniform heat transfer to the drum tube. Preferably, the cooling sleeve extends almost from one axial bearing cover to an opposite axial bearing cover, or a coupling unit that couples the drum tube to the gear unit.

Furthermore, it is preferred that the radial width of the air gap in axial direction is essentially constant. This means that regardless of the axial position, the gap between the cooling sleeve and the drive unit is essentially constant. Usually the drive unit has a uniform outer diameter, although designs are also known in which the drive unit has different outer diameters, for example, due to a gear unit which may have a smaller outer diameter than the electric motor. In this case it is preferred that the cooling sleeve has a shoulder extending radially inwards, so that the air gap between the drive unit and the cooling sleeve can be kept constant. The cooling sleeve and drive unit are thus arranged essentially equidistantly along their axial overlap area.

The radial width of the air gap is preferably in a range of 0.1 mm to 2.5 mm, preferably 0.1 mm to 2.0 mm, further preferably 0.1 mm to 1 mm, and is particularly preferred at about 0.5 mm. It has been shown that a distance that is too small can have a negative effect on installation, but a distance that is too large leads to poorer cooling, since the thermal radiation is dependent on the square of the distance between the two elements. While a distance of 2.5 mm still provides good cooling, it has been shown that a distance of about 0.5 mm is optimal. An air gap with a radial width of 0.5 mm allows good heat transfer from the drive unit to the cooling sleeve, while at the same time simplifying assembly and eliminating the need for unusually high tolerance requirements that would increase manufacturing costs.

According to another preferred design, it is provided that a radially inner surface of the cooling sleeve has a surface roughness of Rz 50 or less, Rz 40 or less, preferably Rz 30 or less. A surface roughness of Rz 25 or less is particularly preferred. The surface of the cooling sleeve is preferably finished. It has been found that a flat surface has a positive effect on the transfer of heat between the drive unit and the cooling sleeve. However, the surface should be as little reflective as possible, i.e., not polished. Nevertheless, an uneven surface with grooves or the like is not positive for heat transfer. A finished surface with a surface roughness of Rz 25 has proved to be particularly suitable, as this can still be produced using standard manufacturing processes without incurring excessive manufacturing costs, but at the same time allowing good heat transfer between the drive unit and the cooling sleeve.

It may also be provided that a radially inner surface of the cooling sleeve has a surface treatment for absorbing thermal radiation.

The idea of transferring a surface treatment for the absorption of thermal radiation to a radially inner surface of an element is also revealed independently. In this respect, the technical idea of surface treatment for the absorption of thermal radiation can also be transferred to the drum tube and this solution is also revealed here. That is to say, a motor-driven conveyor roller for conveyors for conveying containers, pallets, and the like is independently revealed therein, comprising: a drum tube having a cavity formed therein and a longitudinal axis, a shaft extending in the longitudinal axis and on which the drum tube is supported by means of at least one pivot bearing, an electric drive unit disposed in the cavity, wherein a radially inner surface of the drum tube has a surface treatment for absorbing thermal radiation. In such cases, depending on the distance between the drum tube and the drive unit, the cooling sleeve can be omitted.

The surface treatment for absorbing thermal radiation further improves the transfer of heat by means of thermal radiation from the drive unit to the cooling sleeve and/or drum tube. It has been found that by avoiding reflection, heat transfer from the drive unit to the cooling sleeve and/or drum tube can be further improved, thus enabling even more effective cooling of the drive unit.

Suitable surface treatments have been found to be coating with dark pigments, preferably black, preferably matt; anodizing; bronzing (black finishing, burnishing); copper plating. Also mixtures of these are preferred. Especially when anodising and copper plating, it is important that dark, preferably black, oxides are used, especially copper oxide. Coating with dark pigments can be done, in particular, by lacquering, whereby the use of matt lacquer is preferred to the use of glossy lacquer. Overall, it should be noted that the design of the cooling sleeve and/or the inner surface of the drum tube as a black radiator is ideal, and a surface treatment or combination of surface treatments should be selected that comes as close as possible to this ideal optimum.

It is also conceivable to provide both a cooling sleeve and a surface treatment for that axial section of the inner surface of the drum tube which is not covered by the cooling sleeve.

It is also preferred that the cooling sleeve has a thermal conductivity of 100 W/mK or more, preferably 130 W/mK or more. Even higher thermal conductivities of 160 W/mK or even 220 W/mK, for example, are preferred. However, such materials usually cause higher production costs. A thermal conductivity of approximately 130 W/mK has proven to be optimal here.

It is also preferred that the cooling sleeve has a density of 3.5 kg/dm$^3$ or less, preferably 3.0 kg/dm$^3$ or less, more preferably 2.9 kg/dm$^3$ or less. According to the invention, the cooling sleeve is moved together with the drum tube and must be set in rotation. In order not to generate too large of moments of inertia here, it is preferred to use a light metal. Furthermore, light metals are also suitable for heat conduction, so that a synergy can be achieved. Nevertheless, a solid material should be used and not a porous material to keep the thermal conductivity as high as possible.

Preferably the cooling sleeve is made of an aluminium material, preferably an aluminium alloy. Suitable as alloying elements here especially are copper, magnesium, lead, manganese, and silicon.

In accordance with another preferred design, the motor-driven conveyor roller comprises a coupling unit adapted to transmit torque from the drive unit to an inner peripheral surface of the drum tube, the coupling unit comprising a coupling bushing having a drive portion communicating with the drive unit and an outer peripheral driven portion, the coupling bushing being frictionally connected to the inner peripheral surface of the drum tube only at points for transmitting torque. In the prior art, circumferential frictional connections are also known and can also be used here. However, a punctual frictional connection between the coupling bushing and the drum tube has the advantage that the design is simplified. They allow higher tolerances compared to positive-locking connections and fully friction-locking connections, which reduces manufacturing costs. This also avoids the problem of excessive pressure due to insufficient tolerances, thus simplifying the overall production process and making the conveyor roller more cost-effective.

The coupling bushing may have a plurality of radial lugs designed to contact the inner circumferential surface of the drum tube. In this way, the lugs form contact points at which a punctual frictional connection between the coupling bushing and the drum tube is established. The noses are preferably rounded in cross section and/or have a slight trapezoidal shape, forming a slight plateau at the radially outer end. The lugs preferably have an outer contour which is approximately partially cylindrical and extends in the axial direction at least partially, preferably completely, over the coupling bushing. Preferably the radial lugs together define a diameter which is larger than the diameter of the inner circumferential surface of the drum tube. This ensures a particularly good frictional connection between coupling bushing and drum tube, as the lugs together define an oversize and the coupling bushing is thus inserted into the drum tube under pre-tension. For this purpose the lugs are preferably flexible. For example, the coupling bushing is axially slotted. Preferably the lugs are also hollow on the inside.

The coupling unit with coupling bushing and the cooling sleeve can be assembled in one step. It is also conceivable that the coupling unit and the cooling sleeve are designed in one piece or are combined as one unit, as a module, to be mounted together.

In a second aspect of the invention, in a manufacturing process for a motor-driven conveyor roller according to one of the above-described preferred embodiments of a conveyor roller according to the first aspect of the invention, the aforementioned object is solved by the steps of: providing or manufacturing a drum tube; providing or manufacturing a cooling sleeve; pressing the cooling sleeve into the drum tube to fix the cooling sleeve in the drum tube; and inserting a drive unit into the cooling sleeve so that a radial air gap is formed between the drive unit and the cooling sleeve.

It is to be understood that the motor-driven conveyor roller according to the first aspect of the invention and the manufacturing process according to the second aspect of the invention have the same and similar sub-aspects as set out in the dependent claims. In this respect, for preferred designs, further features and their advantages, full reference is made to the above description of the motor-driven conveyor roller according to the first aspect of the invention.

In a first preferred embodiment of the manufacturing process, the cooling sleeve is pressed into the drum tube in such a way that an axial slot of the cooling sleeve does not run along an axial weld seam of the drum tube. When the cooling sleeve is pressed into the drum tube, it exerts an internal pressure on the drum tube and thus a tangential force which can have a negative effect on the weld seam. It has been shown that the application of mechanical force, either due to tangential force or due to shear caused by twisting of the cooling sleeve in the area of the weld seam, should be avoided as far as possible, and therefore the axial slot of the cooling sleeve is aligned in such a way that the weld seam is covered by a flat part of the cooling sleeve, i.e., the axial slot of the cooling sleeve does not run along an axial weld seam of the drum tube.

Furthermore, the manufacturing process preferably comprises the steps of selecting a drum tube having a predetermined diameter from a plurality of drum tubes, said plurality of drum tubes comprising at least one drum tube having an outer diameter of 50 mm and one drum tube having an outer diameter of 60 mm; and selecting a cooling sleeve from a plurality of cooling sleeves, said plurality of cooling sleeves comprising at least one cooling sleeve each provided for a drum tube having the outer diameter 50 mm and for a drum tube having the outer diameter 60 mm; the selection of the cooling sleeve being carried out in such a way that, after insertion of the drive unit into the cooling sleeve, the air gap has a radial width in a range from 0.1 mm to 2 mm, preferably 0.1 mm to 1 mm, particularly preferably approximately 0.5 mm. Preferably the plurality of drum tubes comprises at least one drum tube with an outer diameter of 80 mm and the plurality of cooling sleeves comprises at least one cooling sleeve which is provided for a drum tube with an outer diameter of 80 mm.

As already mentioned above, the drive unit can be designed identically for drum tubes with 50 mm, 60 mm, and 80 mm diameters. However, in order to ensure the best possible cooling of the drive unit, the cooling sleeve differs depending on the outer diameter of the drum tube. The outer diameter of the cooling sleeve must be adapted to the drum tube, while the inner diameter of the cooling sleeve can be formed essentially identically. The cooling sleeve thus acts as a tolerance compensation between the drum tube and the drive unit and leads to a heat dissipation from the drive unit to the drum tube. Depending on the requirement which determines the diameter of the drum tube, either a drum tube with an outer diameter of 50 mm, 60 mm, or even 80 mm is then selected according to this method, the corresponding cooling sleeve matching this outer diameter is selected and the drive unit is inserted.

The assembly is, therefore, considerably simplified and identical common parts can be used. Irrespective of the size of the drum tube, sufficient cooling of the drive unit is provided, so that the drive unit can be equipped with a higher output for the same electric motor.

Furthermore, the manufacturing process preferably comprises the steps of providing or manufacturing a coupling unit having a drive portion for communicating with the drive unit, and an outer peripheral driven portion; and pressing the coupling unit into the drum tube, wherein the coupling unit is frictionally connected to the inner peripheral surface of the drum tube only at points for transmitting torque. Preferably, pressing in the coupling unit and pressing in the cooling sleeve are carried out in one step. Preferably, the coupling unit comprises a coupling and a coupling bushing, whereby the coupling bushing is frictionally connected to the inner circumferential surface of the drum tube only at certain points for the transmission of torque.

Embodiments of the invention are now described below with reference to the drawings. The drawings are not necessarily intended to show a scaled representation, but rather the drawing is, where useful for explanation, executed in schematic and/or slightly distorted form. With regard to additions to the teaching directly recognisable from the drawings, reference is made to the relevant prior art. In this context, it must be taken into account that various modifications and alterations regarding the form and detail of an embodiment can be made without deviating from the general idea of the invention. The features of the invention disclosed in the description, the drawings, and the claims may be essential for the further development of the invention, either individually or in any combination. In addition, all combinations of at least two of the features disclosed in the description, drawings, and/or claims fall within the scope of the invention. The general idea of the invention is not limited to the exact form or detail of the preferred embodiments shown and described below, or limited to an object which would be restricted in comparison to the object claimed in the claims. For specified design ranges, values within the specified limits should also be disclosed as limit values and should be capable of being used as a disclosure and of being claimed. For the sake of simplicity, the same reference signs are used below for identical or similar parts or parts with identical or similar function.

BRIEF DESCRIPTION OF THE DRAWINGS

Further advantages, features, and details of the invention can be found in the following description of the preferred embodiments as well as in the drawings; these show in.

DETAILED DESCRIPTION OF THE EMBODIMENTS

A motor-driven conveyor roller 1 has a drum tube 2, which has a central axis A. The drum tube 2 can be rotated around the central axis A. For this purpose, the conveyor roller has a shaft 4 which, with reference to FIG. 1, extends out of the drum tube 2 on the right and can be mounted in a frame for a conveyor system. No shaft is shown on the left-hand side of drum tube 2 with reference to FIG. 1; the conveyor roller is rather partially broken out here. In normal operation, an additional shaft would be provided on the left-hand side with reference to FIG. 1, which is omitted in the illustration shown in FIG. 1 for the sake of clarity.

Figure 1:
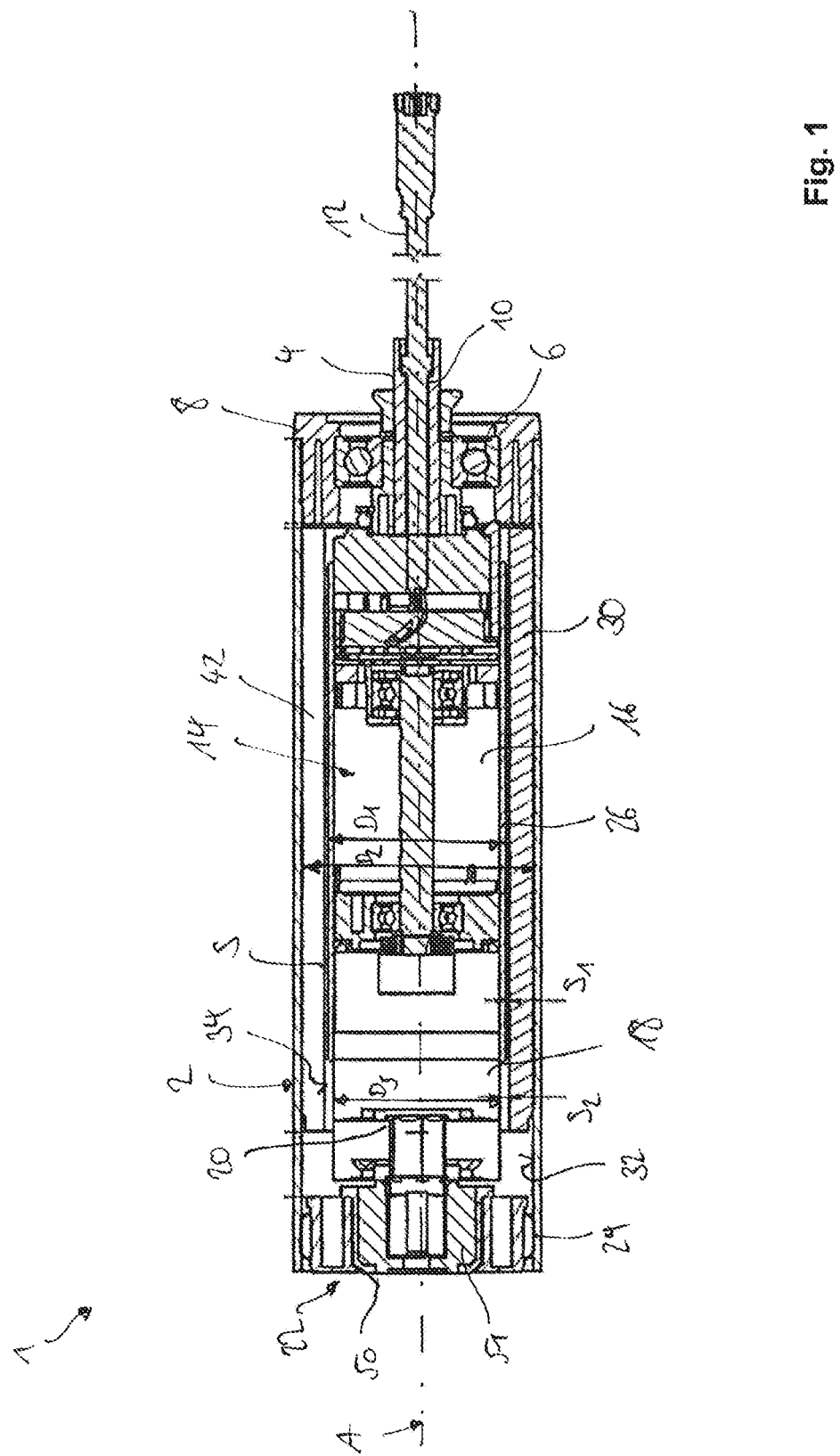
FIG. 1 is a full section through a motor-driven conveyor roller according to a first embodiment.

A rotational bearing 6 is mounted on the shaft 4, which carries a cover 8 that is pressed into the right-hand end of the drum tube 2 with respect to FIG. 1.

The shaft 4 has a central hole 10, through which a supply cable 12 runs. The supply cable 12 runs to a drive unit 14, which has an electric motor 16 and a gear 18, which is designed as a gear cartridge. A coupling unit 22 is provided on the drive output side 20 of gear unit 18, which will be described in more detail later with reference to FIG. 6. This coupling unit 22 serves to transmit the torque supplied by the electric motor 16 via a force-fit (frictional) connection 24 to the drum tube 2 in order to set the drum tube 2 in rotation.

The drive unit 14 has a housing 26, which is essentially rotationally symmetrical. The housing 26 has a diameter D1, which, for example, can be 40 mm. For example, an inner diameter D2 of the drum tube is 48 mm, if the drum tube has an outer diameter of 50 mm. It should be understood that these values are only exemplary and that other values are also possible and preferred. The exact values depend in particular on the type of drive unit 14 as well as on the wall thickness of drum tube 2 and the outer diameter of drum tube 2.

According to the invention, a cooling sleeve 30 is provided to cool the drive unit 14, which at least partially radially surrounds the drive unit 14 and is attached to the drum tube 2. More precisely, the cooling sleeve 30 is pressed into the drum tube 2 and lies flat against the inner circumferential surface 32 of drum tube 2. According to this embodiment (FIG. 1), the cooling sleeve 30 extends in the axial direction from cover 8, or just in front of cover 8, to at least part of the gear unit 18 and thus radially encloses all elements of the conveyor roller 1 that emit heat.

The drive unit 14 is connected to the shaft 4 in a non-rotating manner and is supported against the shaft 4. The housing 26 of the drive unit 14 also does not rotate. To allow rotation of the drum tube 2 together with the cooling sleeve 30, an air gap S is provided between the drive unit 14 and the cooling sleeve 30. In this embodiment (FIG. 1), the air gap S has a radial width S1 in the area of housing 26 and a radial width S2 in the area of gear unit 18, which is not covered by housing 26. The inner surface 34 of the cooling sleeve 30 is flat and does not have any steps or the like. Therefore, the radial width S2 in the area of the gear 18 is slightly larger than the radial width S1 in the area of the housing 26, while the radial width S1 is about 0.5 mm, the radial width S2 is about 2 mm.

Figure 2:
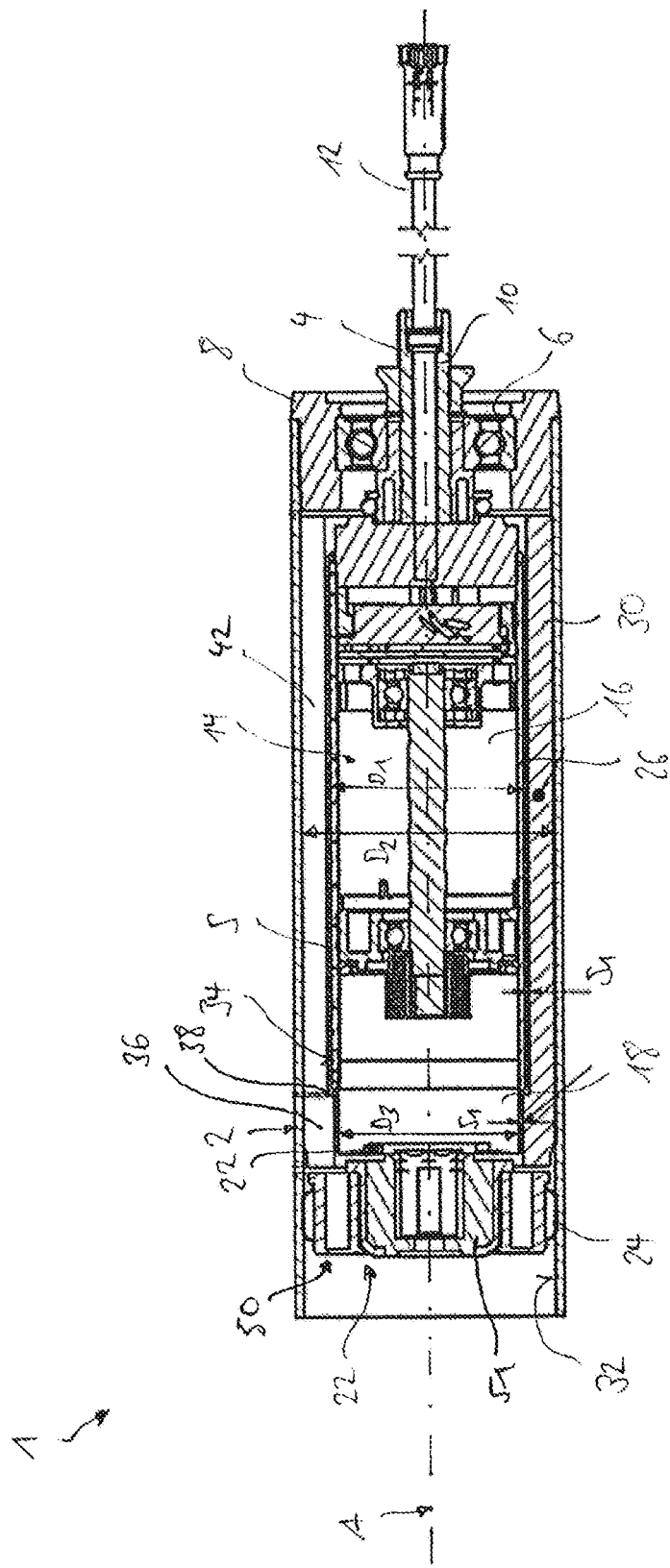
FIG. 2 is a full section through a motor-driven conveyor roller according to a second embodiment.

FIG. 2 shows a second embodiment of the motorized conveyor roller 1. In this second embodiment, identical and similar elements are marked with the same reference signs as in the first embodiment (FIG. 1), so that full reference is made to the above description of the first embodiment. In the following, the differences to the first embodiment are particularly highlighted.

In contrast to the first embodiment, drive unit 14 has only two gear stages, so that the cooling sleeve 30 extends completely axially over electric motor 16 and gear 18. Furthermore, the cooling sleeve 30 has a section 36 which is separated by a circumferential step 38. The section 36 has a slightly reduced inner diameter, so that the cooling sleeve 30 in this section 36 is adapted to the reduced outer diameter D3 of the gear unit 18. In this way the air gap S is uniform and the radial width S1 is provided both in the area of the housing 26 and in the area of the gear unit 18. An expansion of the air gap S as in the first embodiment (FIG. 1) is not provided in this embodiment (FIG. 2).

Figure 3:
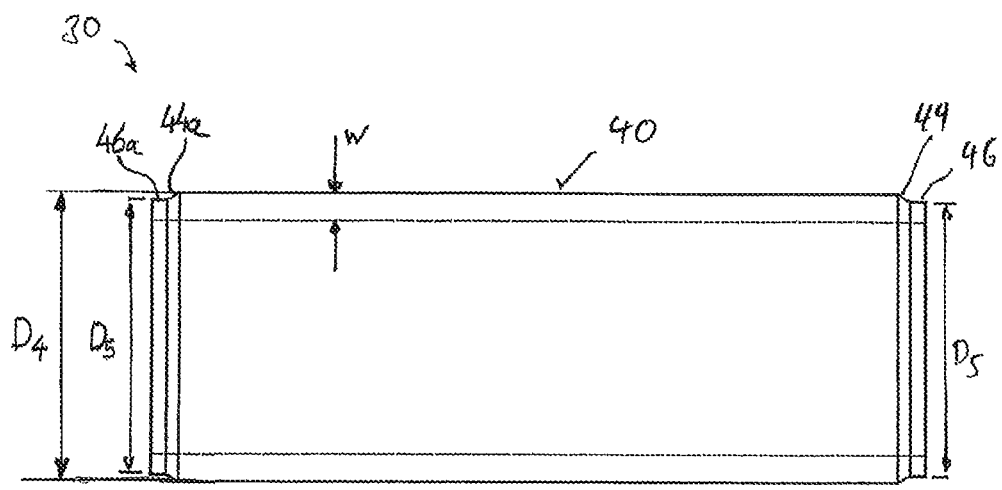
FIG. 3 is a side view of a cooling sleeve.
Figure 4:
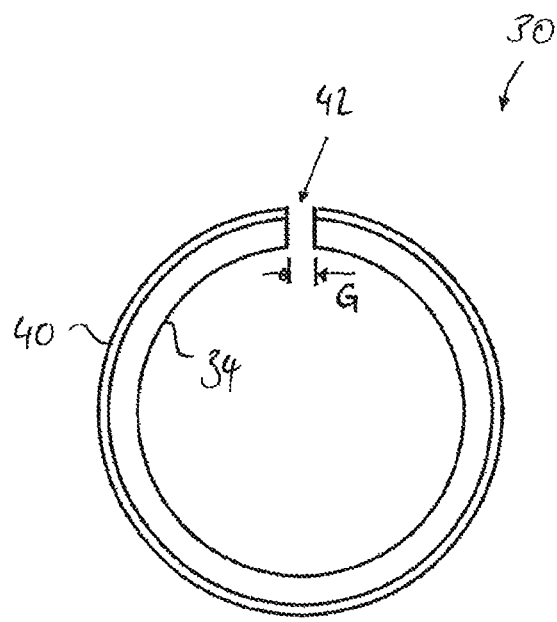
FIG. 4 is a frontal view of the cooling sleeve from FIG. 3.
Figure 5:
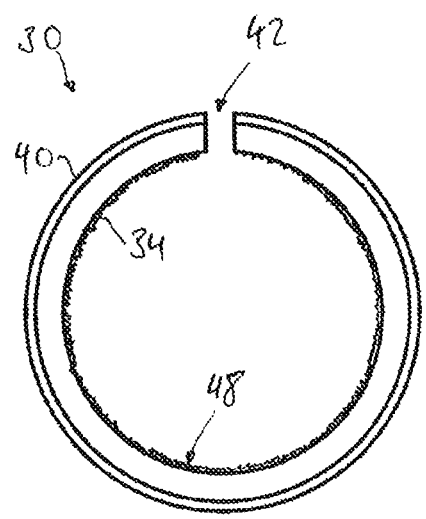
FIG. 5 is a frontal view of a cooling sleeve with a surface-treated inner surface.

The cooling sleeve 30 itself is shown in detail with reference to FIGS. 3 to 5. The cooling sleeve 30 shown in FIG. 3 is the cooling sleeve 30 of the first embodiment (FIG. 1). The cooling sleeve 30 has an essentially cylindrical shape and is manufactured in one piece, for example by computer numerical control (CNC) turning, CNC milling, extrusion, and/or rolling, in particular, cold rolling. The cooling sleeve 30 has an outer diameter D4 which is slightly larger than the inner diameter D2 of the barrel tube 2 to allow for an interference fit.

In order to enable the mounting of the cooling sleeve 30, it is axially slotted and has a slot 42. The slot has a width G, which can be in the range of 4 mm, for example. The width G depends on the wall thickness W of the cooling sleeve 30 as well as on the difference between the outer diameter D4 and the inner diameter D2 and also on the material of the cooling sleeve 30. The width G of the slot 42 should be dimensioned in such a way that it is possible to insert the cooling sleeve 30 into the inside of the barrel tube 2, even taking maximum tolerances into account.

In order to further simplify the assembly process, the cooling sleeve 30 has mounting chamfers 44, 44a on both sides, each ending in a shoulder 46, 46a with a diameter D5. The diameter D5 is smaller than the diameter D4, for example about 4-6% smaller. The diameter D5 should be dimensioned so that it is also slightly smaller than the diameter D2, so that the cooling sleeve 30 can initially be inserted into the inside of the drum tube 2 with the shoulder 46 without any problems and without applying a large force during assembly, before radial compression of the cooling sleeve 30 takes place, in order to then move it completely into the inside of the drum tube 2.

The inclination of chamfer 44, for example, can be in the range of 60° to the central axis A.

Due to the chamfers 44, 44a on both sides, the cooling sleeve can be pressed in each of the two conceivable orientations, so that incorrect assembly is impossible and an alignment step of the cooling sleeve to press in a defined side of the cooling sleeve in front can be omitted in an automated assembly.

Both the inner surface 34 and the outer surface 40 of the cooling sleeve 30 have a surface roughness of preferably Rz 30 or less, preferably Rz 25 or less. This means that both surfaces 34, 40 are preferably finished. The outer surface 40 should be formed in such a way that a frictional connection with the inner circumferential surface 32 of the drum tube 2 is as secure as possible and, at the same time, the contact area should be as large as possible in order to allow heat conduction from the cooling sleeve 30 to the drum tube 2.

The inner surface 34 should be formed in such a way that it does not reflect, but allows the most efficient heat radiation from the drive unit 14 to the cooling sleeve 30.

For this purpose, it may be provided that the cooling sleeve 30 has a surface treatment 48 on its inner surface 34, for example, a bronzing, anodizing, or a coloured layer, in particular, with a dark colour, particularly black, in order to absorb thermal radiation as well as possible and reflect little thermal radiation.

In total, the cooling sleeve 30 is preferably made of a light metal. Aluminium is particularly useful here. Aluminium should be used which has a density of preferably 3 kg/dm3 or less and a thermal conductivity of preferably 130 W/mK or more. Suitable alloying metals can be added to the aluminium for this purpose.

Figure 6:
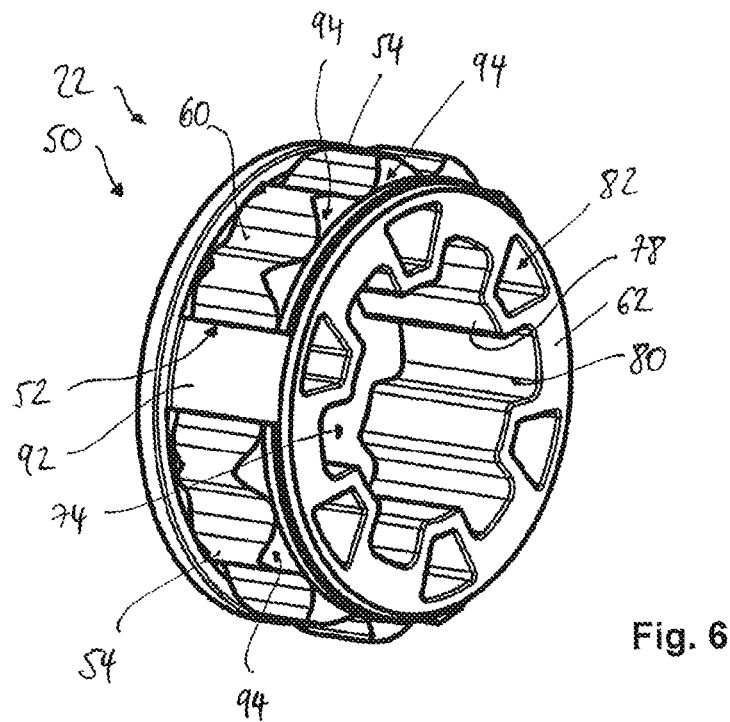
FIG. 6 is perspective view of a coupling unit with a coupling bushing.

FIG. 6 shows a part of coupling unit 22, which has already been shown in section in FIGS. 1 and 2. The coupling unit 22 acts exclusively frictionally and is preferably mounted together with the cooling sleeve 30. This coupling unit 22 is described in the German patent application DE 10 2016 124 689 of the local applicant, whose disclosure content is fully included in this application.

The coupling unit 22 has a coupling bushing 50, in whose central opening 74 a toothed shaft piece 51 can engage. The toothed shaft piece 51 is connected to the output of the gear unit 18.

The coupling bushing 50 has a two-part design and has a radially inner part 62 and a radially outer part 60. The radially outer part 60 forms an output section 52, which is frictionally connected to the inner circumferential surface 32 of the drum tube 2.

The inner part 62 has a substantially cylindrical circumferential surface 92, to which the outer part 60 is applied in the form of a corrugated metal strip. The corrugated metal strip of the outer part 60 forms a plurality of lugs 54, which are hollow in this design and define a cavity 94 inside. This provides the elasticity of the lugs 54, and manufacturing tolerances can be compensated.

The inner part 62 has projections 78, in which axial recesses 82 are provided. These axial recesses 82 serve on the one hand to reduce weight and on the other hand to make the projections 78 elastic in order to allow torque transmission from the splined shaft piece 51 to the inner part 62 elastically.

The corrugated sheet metal strip, which forms the outer part 60, interacts frictionally with both the inner circumferential surface 32 and the outer surface 92 of the inner part 62. Due to the flexibility of the sheet metal strip, tolerances can be compensated and a permanent frictional connection is provided. It is conceivable that the coupling bushing 50 is pushed into the inside of the drum tube 2 by means of the cooling sleeve 30. This saves one additional assembly tool for mounting the coupling bushing 50, as the coupling bushing 50 is mounted in one step with the cooling sleeve 30.

The invention claimed is:

1. A motor-driven conveyor roller for conveyor systems comprising:
    a drum tube having a cavity formed therein and a longitudinal axis;
    a shaft disposed along the longitudinal axis and on which the drum tube is mounted by at least one bearing;
    an electric drive unit positioned in the cavity; and
    a cooling sleeve disposed on an inner durface of and fixed to the drum tube and which at least partially radially surrounds the electric drive unit so that a radial air gap is formed between the electric drive unit and the cooling sleeve.

2. The motor-driven conveyor roller according to claim 1, wherein the cooling sleeve is force-fitted to the drum tube.

3. The motor-driven conveyor roller according to claim 1, wherein the cooling sleeve is axially slotted.

4. The motor-driven conveyor roller according to claim 1, wherein the electric drive unit comprises an electric motor and the cooling sleeve extends in an axial direction substantially over the electric motor.

5. The motor-driven conveyor roller according to claim 1, wherein the electric drive unit comprises a gear and the cooling sleeve extends in an axial direction substantially over the gear.

6. The motor-driven conveyor roller according to claim 1, wherein the radial width of the radial air gap is substantially constant in an axial direction.

7. The motor-driven conveyor roller according to claim 1, wherein the radial air gap has a radial width in a range from 0.1 mm to 2.5 mm.

8. The motor-driven conveyor roller according to claim 7, wherein the radial air gap has a radial width of about 0.5 mm.

9. The motor-driven conveyor roller according to claim 1, wherein a radially inner surface of the cooling sleeve has a surface roughness of Rz 50 or less.

10. The motor-driven conveyor roller according to claim 9, wherein the radially inner surface of the cooling sleeve has a surface roughness of Rz 30 or less.

11. The motor-driven conveyor roller according to claim 1, wherein a radially inner surface of the cooling sleeve has a surface treatment for absorbing thermal radiation.

12. The motor-driven conveyor roller according to claim 11, wherein the surface treatment is selected from the group consisting of coating the radially inner surface of the cooling sleeve with dark pigments, anodizing the radially inner surface of the cooling sleeve, bronzing the radially inner surface of the cooling sleeves, and copper plating the radially inner surface of the cooling sleeve.

13. The motor-driven conveyor roller according to claim 12, wherein the surface treatment comprises coating the radially inner surface of the cooling sleeve with black matt pigments.

14. The motor-driven conveyor roller according to claim 1, wherein the cooling sleeve has a thermal conductivity of 100 W/mK or more.

15. The motor-driven conveyor roller according to claim 14, wherein the cooling sleeve has a thermal conductivity of 130 W/mK or more.

16. The motor-driven conveyor roller according to claim 1, wherein the cooling sleeve is formed of a material having a density of 3.5 kg/dm$^3$ or less.

17. The motor-driven conveyor roller according to claim 16, wherein the cooling sleeve is formed of a material having a density of 2.9 kg/dm$^3$ or less.

18. The motor-driven conveyor roller according to claim 1, wherein the cooling sleeve is formed of an aluminum material.

19. The motor-driven conveyor roller according to claim 1, further comprising:
    a coupling unit adapted to transmit a torque from the electric drive unit to an inner peripheral surface of the drum tube, the coupling unit comprising a coupling bushing having a drive input portion communicating with the electric drive unit and an outer peripheral drive output portion;
    wherein the coupling bushing is frictionally connected to the inner circumferential surface of the drum tube only at points for the transmission of torques.

20. A manufacturing method for a motor-driven conveyor roller having a drum tube with a cavity formed therein and a longitudinal axis, a shaft disposed along the longitudinal axis and on which the drum tube is mounted by at least one bearing, an electric drive unit positioned in the cavity, and a cooling sleeve fixed radially inwardly to the drum tube and which at least partially radially surrounds the electric drive unit so that a radial air gap is formed between the electric drive unit and the cooling sleeve, the method comprising the steps of:
    providing the drum tube;
    providing the cooling sleeve;
    pressing the cooling sleeve into the drum tube to fix the cooling sleeve inside the drum tube; and
    inserting the electric drive unit into the cooling sleeve so that the radial air gap is formed between the electric drive unit and the cooling sleeve.

21. The manufacturing method according to claim 20, wherein the cooling sleeve is pressed into the drum tube such that an axial slit of the cooling sleeve does not extend along an axial weld seam of the drum tube.

22. The manufacturing process according to claim 20, further comprising the steps of:
   providing a coupling unit having a drive input portion for communicating with the electric drive unit and having an outer peripheral drive output portion; and
   pressing the coupling unit into the drum tube, wherein the coupling unit is connected to the inner circumferential surface of the drum tube with frictional engagement only at points for the transmission of torques.

23. The manufacturing method according to claim 22, wherein the pressing in step of the coupling unit and the pressing in step of the cooling sleeve are carried out as a single step.

24. A manufacturing process for a motor-driven conveyor roller comprising a drum tube with a cavity formed therein and a longitudinal axis, a shaft disposed along the longitudinal axis and on which the drum tube is mounted by at least one bearing, an electric drive unit positioned in the cavity, and a cooling sleeve fixed radially inwardly to the drum tube and which at least partially radially surrounds the electric drive unit so that a radial air gap is formed between the electric drive unit and the cooling sleeve, the method comprising the steps of:
   selecting the drum tube from a plurality of drum tubes having a predetermined diameter, wherein the plurality of drum tubes comprises at least one drum tube having an outer diameter of 50 mm and at least one drum tube having an outer diameter of 60 mm; and
   selecting the cooling sleeve from a plurality of cooling sleeves, wherein the plurality of cooling sleeves comprises at least one cooling sleeve which is provided for the at least one drum tube having an outer diameter of 50 mm and at least one cooling sleeve which is provided for the least one drum tube having an outer diameter of 60 mm;
   the selection of the cooling sleeve being carried out such that, after insertion of the electric drive unit into the cooling sleeve, the radial air gap has a radial width in a range from 0.1 mm to 2.5 mm.

\* \* \* \* \*

UNITED STATES PATENT AND TRADEMARK OFFICE
CERTIFICATE OF CORRECTION

PATENT NO. : 11,091,321 B2  
APPLICATION NO. : 16/646223  
DATED : August 17, 2021  
INVENTOR(S) : Dorok et al.

Page 1 of 1

It is certified that error appears in the above-identified patent and that said Letters Patent is hereby corrected as shown below:

In the Claims

Column 11, Claim 1, Line 45, "durface" should be --surface--.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*